United States Patent
Kameyama

(10) Patent No.: US 8,135,215 B2
(45) Date of Patent: Mar. 13, 2012

(54) CORRECTION OF COLOR BALANCE OF FACE IMAGES

(75) Inventor: Hirokazu Kameyama, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/972,962

(22) Filed: Dec. 20, 2010

(65) Prior Publication Data

US 2011/0091103 A1 Apr. 21, 2011

Related U.S. Application Data

(62) Division of application No. 11/333,268, filed on Jan. 18, 2006, now Pat. No. 7,936,919.

(30) Foreign Application Priority Data

Jan. 18, 2005 (JP) ................................ 2005-010521
Jan. 28, 2005 (JP) ................................ 2005-020507

(51) Int. Cl.
   *G06K 9/00* (2006.01)
   *G03F 3/08* (2006.01)
(52) U.S. Cl. .................... 382/167; 358/518; 345/600
(58) Field of Classification Search .................. None
   See application file for complete search history.

(56) References Cited

U.S. PATENT DOCUMENTS

| | | |
|---|---|---|
| 4,203,671 A | 5/1980 | Takahashi et al. |
| 5,085,325 A | 2/1992 | Jones et al. |
| 5,278,921 A | 1/1994 | Nakamura et al. |
| 5,287,204 A | 2/1994 | Koizumi et al. |
| 5,315,413 A | 5/1994 | Yamamoto et al. |
| 5,786,906 A | 7/1998 | Shishizuka |
| 6,014,457 A | 1/2000 | Kubo et al. |
| 6,018,588 A * | 1/2000 | Kim ............................. 382/167 |
| 6,148,103 A | 11/2000 | Nenonen |
| 6,249,592 B1 | 6/2001 | Fan et al. |
| 6,940,545 B1 | 9/2005 | Ray et al. |
| 6,972,866 B1 | 12/2005 | Bares et al. |
| 6,980,691 B2 | 12/2005 | Nesterov et al. |
| 7,072,506 B1 | 7/2006 | Hirota et al. |
| 7,602,969 B2 * | 10/2009 | Yamada et al. ............... 382/167 |
| 2001/0035988 A1 | 11/2001 | Semba et al. |

(Continued)

FOREIGN PATENT DOCUMENTS

JP 07-271973 A 10/1995

(Continued)

OTHER PUBLICATIONS

Japanese Patent Office Action dated Dec. 15, 2009 and English-language translation thereof.

(Continued)

*Primary Examiner* — Bhavesh Mehta
*Assistant Examiner* — Barry Drennan
(74) *Attorney, Agent, or Firm* — Sughrue Mion, PLLC

(57) ABSTRACT

On the basis of image data representing the area of a face image contained in an image represented by applied image data, a color correction value calculating circuit calculates a color correction value and a color image probability calculating circuit calculates the probability that the area of the face image is a color image. A color correction value adjusting circuit then adjusts the color correction value based upon the probability that the area of the face image is a color image. The adjusted color correction value is used in correction processing in an image correcting circuit.

11 Claims, 8 Drawing Sheets

U.S. PATENT DOCUMENTS

| | | |
|---|---|---|
| 2002/0105662 A1 | 8/2002 | Patton et al. |
| 2002/0181767 A1 | 12/2002 | Deng et al. |
| 2004/0218832 A1 | 11/2004 | Luo et al. |
| 2004/0264772 A1 | 12/2004 | Une |
| 2005/0008243 A1 | 1/2005 | Fujino |
| 2005/0134702 A1 | 6/2005 | Subbotin |
| 2005/0276481 A1 | 12/2005 | Enomoto |
| 2006/0013478 A1 | 1/2006 | Ito et al. |

FOREIGN PATENT DOCUMENTS

| | | |
|---|---|---|
| JP | 11-168620 A | 6/1999 |
| JP | 2000-182043 A | 6/2000 |
| JP | 2000-261677 A | 9/2000 |
| JP | 2002-279416 A | 9/2002 |
| JP | 2003-299115 A | 10/2003 |
| JP | 2007-534179 A | 11/2007 |
| WO | WO 2004/010711 * | 1/2004 |
| WO | 2004/032524 A1 | 4/2004 |

OTHER PUBLICATIONS

Hosoi, "Ethnicity Estimation with Facial Images," Proceedings of the SIxth IEEE International Conference on Automatic and Face and Gesture Recognition (FGR '04).

Japanese Patent Office Action dated Nov. 25, 2009 (mailed Dec. 1, 2009).

* cited by examiner

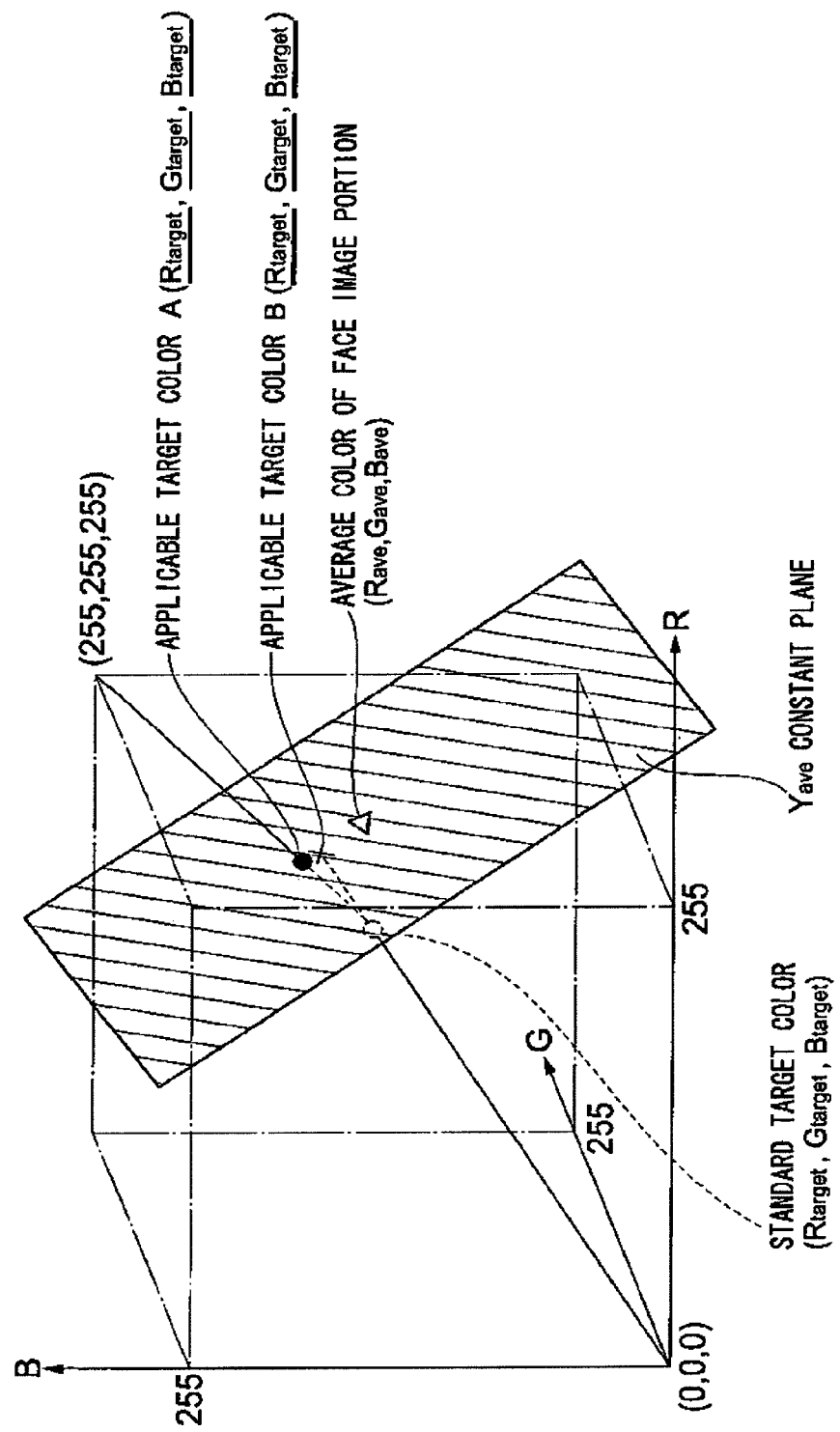

CORRECTION OF COLOR BALANCE OF FACE IMAGES

This application is a divisional application of U.S. Ser. No. 11/333,268, filed Jan. 18, 2006, which claims priority to JP 2005-010521, filed Jan. 18, 2005, and JP 2005-020507, filed Jan. 28, 2005, each of which is incorporated by reference herein in its entirety.

BACKGROUND OF THE INVENTION

1. Field of the Invention

This invention relates to an image correction apparatus and method for applying color correction processing (color conversion processing) to digital image data, and to a program that causes a computer to execute this image correction processing.

2. Description of the Related Art

When a color print is created using digital image data obtained by reading image data, which has been recorded on photographic negative film or reversible film, as by a scanner, or digital image data acquired by a digital camera or mobile telephone equipped with a camera, there are instances where the color print is created upon subjecting the digital image data to color correction processing that corrects color balance in such a manner that the impression obtained will be similar to that of the scene when the picture was taken.

The specification of Japanese Patent Application Laid-Open No. 2000-182043 (Patent Reference 1) proposes detecting an image, which represents, e.g., the face of a person, based upon entered image data, obtaining coefficients $k_1$, $k_2$ whereby the color of the image representing the detected face of the person is made a desired color (skin tone), and subjecting the overall image data to color conversion processing (color correction) using the coefficients $k_1$, $k_2$ obtained.

Patent Reference 1 assumes that the image data to be processed is image data representing a color image; it does not take into account a case where image data to be processed does not represent a color image, e.g., a case where the data is image data representing a monochrome image. If an image representing the face of a person contained in the image to be processed is a monochrome image, the color of the image representing the face of the person that is the monochrome image will be color-corrected to the skin-tone color. Owing to such color correction processing, an image that is widely different from the original image is produced.

Further, Patent Reference 1 does not take into account the relationship between brightness of an image representing the face of a person before color conversion processing and brightness of the image representing the face of the person after color conversion processing. In Patent Reference 1, color conversion processing is applied to the entirety of the image data in such a manner that the color (skin tone) of the image data of the face area will have a predetermined target chromaticity value. The brightness of the face of the person in the image represented by the image data after the color conversion comes to have a brightness that is based upon the predetermined target chromaticity value. Basically, therefore, the brightness of the image representing the face of the person before the color conversion and the brightness of the image representing the face of the person after the color conversion do not agree.

SUMMARY OF THE INVENTION

Accordingly, an object of the present invention is to so arrange it that the result of a correction that is widely different from the original image will not be produced by the color correction processing of image data.

Another object of the present invention is to apply a correction in such a manner that the color of a specific image portion contained in an image represented by image data to be processed will have a desired color and to so arrange it that the brightness of the specific image portion before the correction will not differ from the brightness after the correction.

A further object of the present invention is to prevent the specific image portion after the correction from being color-corrected excessively.

According to a first aspect of the present invention, the foregoing objects are attained by providing an image correction apparatus comprising: color correction value calculating means (device) for calculating a color correction value based upon specific (particular) image data representing a specific (particular) image contained in an image represented by applied image data, the color correction value being premised on the fact that the specific image is an image of one type among images of a plurality of types; probability calculating means (device) for calculating a probability that the specific image is the image of the one type among the images of the plurality of types based upon the specific image data; color correction value adjusting means (device) for adjusting the color correction value, which has been calculated by the color correction value calculating means (device), based upon the probability calculated by the probability calculating means (device); and correcting means (device) for applying a color correction to at least the specific image data among the applied image data based upon a new color correction value resulting from the adjustment by the color correction value adjusting means (device).

According to the first aspect of the present invention, the foregoing objects are attained by providing an image correction method comprising the steps of: calculating a color correction value based upon specific image data representing a specific image contained in an image represented by applied image data, the color correction value being premised on the fact that the specific image is an image of one type among images of a plurality of types; calculating a probability that the specific image is the image of the one type among the images of the plurality of types based upon the specific image data; adjusting the color correction value based upon the probability calculated; and applying a color correction to at least the specific image data in the applied image data based upon a new color correction value resulting from the adjustment.

According to the first aspect of the present invention, the foregoing objects are attained by providing a program for causing a computer to execute image correction processing (a program for causing a computer to function as an image correction apparatus). The program causes the computer to execute the following processing: color correction value calculation processing for calculating a color correction value based upon specific image data representing a specific image contained in an image represented by image data supplied from a storage device (a hard disk, a memory card, a CD-ROM or a DVD-ROM, etc.), the color correction value being premised on the fact that the specific image is an image of one type among images of a plurality of types; probability calculation processing for calculating a probability that the specific image is the image of the one type among the images of the plurality of types based upon the specific image data; color correction value adjustment processing for adjusting the color correction value, which has been calculated by the color correction value calculation processing, based upon the probability calculated by the probability calculation processing;

and correction processing for applying a color correction to at least the specific image data among the applied image data based upon a new color correction value resulting from the adjustment by the color correction value adjustment processing. It may be so arranged that all of this processing is executed by a CPU included in the computer or so that some of the processing is executed by special-purpose hardware.

The specific image data representing the specific image contained in the image represented by the applied image data is specified (demarcated, partitioned or extracted) from among image data applied by pattern matching, by way of example.

The color correction value is calculated on the assumption that the specific image is an image of one type among images of a plurality of types. For example, one type of image is a color image. In this case the color correction value is calculated on the assumption that the specific image is a color image. For example, a value for correcting average color, which is obtained from the specific image, to a prescribed color (a color prepared in advance or a color applied externally) is calculated as the color correction value. In one embodiment, the color correction value calculating means calculates the color correction value that makes representative color information (e.g. average RGB values) calculated based upon the specific image data in agreement with target color information (e.g. RGB values) that has been set.

Furthermore, based upon the specific image data, the probability that the specific image data is the image of the one type among the images of the plurality of types is calculated.

In one embodiment, the probability calculating means calculates the probability in accordance with data representing saturation, hue or chromaticity obtained based upon the specific image data. For example, in a case where saturation obtained from the specific image data is high, it is very likely that the specific image is a color image. In a case where saturation is low, on the other hand, it is very likely that the specific image is not a color image (e.g., it is construed that the specific image is a monochrome image). Further, if a hue value obtained from the specific image data has a plurality of hues, then it is very likely that the specific image is a color image. If the hue value has a single specific hue, then it is very likely that the specific image is not a color image (e.g., it is construed that the specific image is a sepia-tone image). Thus, the probability that the specific image is one type of image is calculated in dependence upon saturation, hue or chromaticity obtained based upon the specific image data.

The color correction value calculated by the color correction value calculating means is adjusted based upon the probability calculated by the probability calculating means, and at least the specific image data in the applied image data is color-corrected based upon the new color correction value obtained by the adjustment. The new color correction value obtained by the adjustment is inclusive of a value that is the same as the color correction value that prevailed before the adjustment.

In accordance with the first aspect of the present invention, the degree of color correction applied to image data (the extent of the correction effect) can be adjusted in accordance with the possibility that a specific image is of one type, i.e., in accordance with the probability calculated by the probability calculating means. The color correction value is one calculated on the assumption that the specific image is of one type. This means that if the probability that the specific image is an image of one type is high, it will suffice to apply the calculated color correction value as is. On the other hand, if, in a case where the probability that the specific image is the image of the one type is low, a color correction value that has been calculated on the assumption that the specific image is the specific image of the one type is used as is in correcting the image data, then it is very likely that the image data obtained after the correction will appear strange. By weakening the effect of applying the color correction value in a case where the probability that the specific image is the image of the one type is low, it is possible to prevent the specific image from being corrected to an image that appears strange.

Further, in accordance with the first aspect of the present invention, the probability that a specific image is an image of one type is calculated and the color correction value adjusted in accordance with the calculated probability without distinguishing whether the specific image is the image of the one type or an image of another type. This assures that the results of image correction will not undergo an extreme divergence.

Preferably, in case where the specific image is a face image of a person, the apparatus may further comprises target color information storage means (device) for storing target color information corresponding to respectively of a plurality of races, and racial distinction means (device) for distinguishing the race of the person represented the specific image data representing the face image. The color correction value calculating means (device) calculates the color correction value by using target color information with regard to the distinguished race. It is possible to calculate the color correction value corresponding to the distinguished race.

In a case where a plurality of the specific images are contained in an image represented by applied image data, it will suffice to calculate the color correction value with regard to each of the plurality of specific images, calculate the probability of the image of the one type with regard to each of the plurality of specific images and, on the basis of the lowest probability among the plurality of probabilities calculated, adjust the color correction value obtained from one specific image that was used in calculating the lowest probability.

According to a second aspect of the present invention, the foregoing objects are attained by providing an image correction apparatus comprising: representative color information calculating means (device) for calculating color information representative of a specific image contained in an image represented by applied image data; target color information setting means (device) for setting target color information; target color information modifying means (device) for modifying the target color information, while maintaining a tint that is based upon the target color information that has been set by the target color information setting means (device), in such a manner that target brightness information calculated based upon the target color information that has been set will be the same as representative brightness information of the specific image calculated based upon the representative color information of the specific image that has been calculated by the representative color information calculating means (device); and image data correcting means (device) for correcting at least data representing the specific image in the applied image data in such a manner that the representative color information of the specific image that has been calculated by the representative color information calculating means (device) will have the modified target color information obtained as a result bf the modification by the target color information modifying means (device).

According to the second aspect of the present invention, the foregoing objects are attained by providing an image correction method comprising the steps of: calculating color information representative of a specific image contained in an image represented by applied image data; setting target color information; modifying the target color information, while maintaining a tint that is based upon the target color information that has been set, in such a manner that target brightness information calculated based upon the target color information that has been set will be the same as representative brightness information calculated based upon the color information of the specific image that has been calculated; and correcting at least data representing the specific image in the applied image data in such a manner that the representative color information of the specific image that has been calculated will have the modified target color information obtained as a result of the modification.

According to the second aspect of the present invention, the foregoing objects are attained by providing a program for causing a computer to execute the image correction method set forth above (a program for causing a computer to function as an image correction apparatus). The program causes the computer to execute the following processing: representative color information calculating processing for calculating color information representative of a specific image contained in an image represented by image data supplied from a storage device (a hard disk, a memory card, a CD-ROM or a DVD-ROM, etc.); target color information setting processing for setting target color information; target color information modifying processing for modifying the target color information, while maintaining a tint that is based upon the target color information that has been set by the target color information setting processing, in such a manner that target brightness information calculated based upon the target color information that has been set will be the same as representative brightness information of the specific image calculated based upon the representative color information of the specific image that has been calculated by the representative color information calculating processing; and image data correction processing for correcting at least data representing the specific image in the applied image data in such a manner that the representative color information of the specific image that has been calculated by the representative color information calculating processing will have the modified target color information obtained as a result of the modification by the target color information modifying processing. It may be so arranged that all of this processing is executed by a CPU included in the computer or so that some of the processing is executed by special-purpose hardware.

The specific image (specific image data representing the specific image) contained in the image represented by the applied image data is specified (demarcated, partitioned or extracted) from among image data applied by pattern matching, by way of example.

Color information representative of a specific image is calculated. In an embodiment, the representative color information of the specific image is an average, mode or median of color information (e.g., R, G, B values) possessed by each of a plurality of pixels that constitute the specific image.

The target color information is set. It may be so arranged that the target color information is input from an input unit or set in advance. Target color information that has been set in advance may of course be modified (changed) by an operator using an input unit.

In case where said specific image is a face image of a person, the apparatus further comprises target color information storage means (device) for storing target color information corresponding to each of a plurality of races; and race distinction means (device) for distinguishing a race of the person represented by said specific image data representing the face image, and said target color information setting means (device) sets the target color information with regard to the race distinguished by said race distinction means (device). It is possible to set the target color information corresponding to the distinguished race.

The target color information is color information after color correction with regard to representative color information of a specific image in an original image. If color correction is carried out in such a manner that the representative color information of the specific image becomes the target color information, then the specific image contained in the original image will be corrected to a color that is in line with the target color information. For example, if the specific image is the face image portion of a person, then the target color information will be information that stipulates the skin-tone color. The original image will be corrected in such a manner that the face image portion of the person in the original image will have the set skin tone.

However, if the brightness of the specific image coincides with a brightness that is based upon the target color information, the brightness of the specific image before the color correction will be equal to the brightness of the specific image after the color correction. If the brightness of the specific image does not coincide with the brightness that is based upon the target color information, however, then the brightness of the specific image after the color correction will be a brightness that is based upon the target color information. There is a possibility that the brightness of the specific image in the original image before the color correction will be completely different from the brightness of the specific image in the original image after the color correction.

Accordingly, the target color information is modified in such a manner that the brightness information calculated based upon the target color information will be the same (or substantially the same) as representative brightness information of the specific image calculated based upon the representative color information of the specific image.

Furthermore, in accordance with the second aspect of the present invention, the modified target color information retains the tint that is based upon the target color information that has been set.

In accordance with the second aspect of the present invention, as described above, the modified target color information is obtained as a result of modifying the target color information, while maintaining the tint that is based upon the target color information that has been set by the target color information setting means, in such a manner that target brightness information calculated based upon the target color information that has been set will be the same as representative brightness information of the specific image calculated based upon the representative color information of the specific image that has been calculated by the representative color information calculating means. As a result, if at least data representing the specific image in the applied image data is color-corrected in such a manner that the representative color information of the specific image will have the modified target color information, then it will be possible to obtain an corrected image in which the specific image after the color correction has a brightness the same as that of the specific image before the color correction, and to obtain an corrected image having a desired tint base upon the target color information that has been set.

The color correction processing may be applied only to a specific image portion in an original image or to the entirety of the original image.

In an embodiment, the target color information modifying means adopts as the modified target color information a point of intersection in color space between a line (inclusive of a straight line and a curve), which passes through the origin and a point stipulated by the target color information, and a constant-brightness plane stipulated by the representative color information of the specific image. In color space, e.g., RGB three-dimensional space, the intersection between a line passing through the origin (0,0,0) and the target color information (e.g., R, G, B values), and a plane of constant brightness information (e.g., a luminance value) calculated based upon the representative color information is adopted as the modified target color information. Since the modified target color information becomes a value in a constant-brightness plane stipulated by the representative color information, the brightness information calculated based upon the modified target color information will agree with the brightness information of the specific image. If color correction is applied to at least data representing the specific image in the applied image data in such a manner that the representative color information becomes the modified target color information, then the brightness of the specific image after the color correction will agree with the brightness of the specific image contained in the original image. Further, since the modified target color information resides on a line that passes through the origin (0,0,0) and the target color information (R, G, B values), it will have a tint that is in accordance with the tint of the target color information that is set.

The modified target color information may be modified further so as to reduce saturation that is based upon the modified target color information obtained by the modified target color information modifying means. In this case, the target color information modifying means in one embodiment adopts as the modified target color information a point of intersection in color space (e.g., RGB color space) between a line (inclusive of a straight line and a curve), which passes through a point stipulated by the target color information and a maximum point (255,255,255) in color space, and a constant-brightness plane stipulated by representative brightness information of the specific image. The saturation of the modified target color information diminishes in comparison with a case where the intersection between the line passing through the origin (0,0,0) and the target color information (R, G, B values), and the constant-brightness plane stipulated by the representative color information is adopted as the target color information after modification. The specific image after correction is prevented from taking on an impression that it has been corrected excessively, and it is possible to prevent a situation in which the specific image obtained after the correction gives an impression that is widely different from the specific image contained in the original image. It should be noted that since the modified target color information is a value on the line passing the point specified by the target color information and the maximum point (255,255,255) in color space, the tint of the target color information after modification will not differ greatly from the tint that is based upon the target color information that is set.

That apparatus may further comprise determination means (device) for determining whether the representative brightness information of the specific image exceeds a prescribed threshold value. If it has been determined by the determination means that the representative brightness information exceeds the prescribed threshold value, then the target color information modifying means modifies the target color information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 illustrates a standard target color, applicable target color, average color of a face image portion and a constant-luminance plane obtained from the face image portion in RGB space.

DESCRIPTION OF THE PREFERRED EMBODIMENTS

Preferred embodiments of the present invention will now be described in detail with reference to the accompanying drawings.

[First Embodiment]

Figure 1:
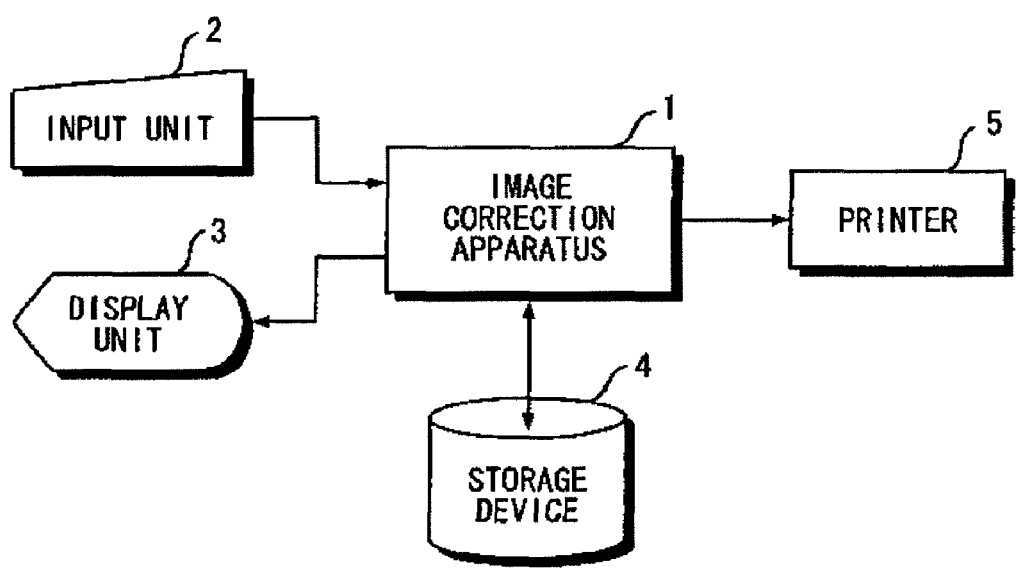
FIG. 1 is a block diagram illustrating the overall configuration of a digital printing system.
Figure 2:
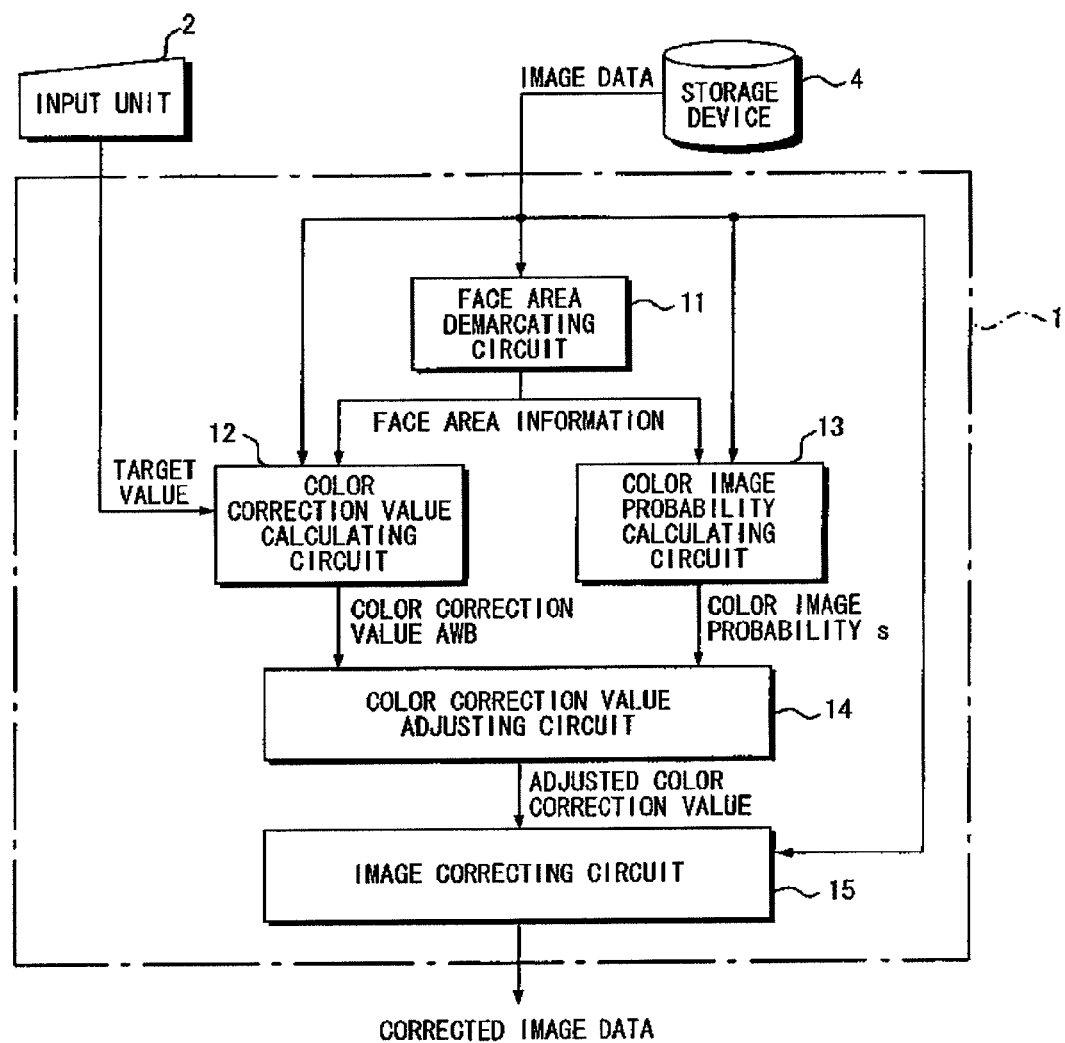
FIG. 2 is a block diagram illustrating in detail the electrical structure of an image correction apparatus as well as the flow of data in the apparatus according to a first embodiment of the present invention.

FIG. 1 is a block diagram illustrating .the overall configuration of a digital printing system. The digital printing system comprises an image correction apparatus 1 and an input unit 2, display unit 3, storage device 4 and printer 5 connected to the image correction apparatus 1. FIG. 2 is a block diagram illustrating in detail the electrical structure of an image correction apparatus 1 as well as the flow of data in the apparatus.

The image correction apparatus 1 is an apparatus for correcting image data in such a manner that the color balance of an image represented by applied image data will have an appropriate color balance. (This correction shall be referred to as a "color correction" below.) The image correction apparatus 1 applies a color correction to the applied image data and outputs the image data that is the result of the color correction.

As will become evident from the description that follows, the image correction apparatus 1 functions to determine whether a specific image portion contained in an image represented by image data to be subjected to a color correction is a color image or a monochrome image (the image correction apparatus 1 calculates the probability that the specific image portion is a color image) and to modify (adjust) the degree of application of the color correction to the image data in accordance with the result of the determination.

The input unit 2 (keyboard and mouse, etc.) connected to the image correction apparatus 1 is used to input a target value for color correction processing. The display unit 3 (a CRT display or liquid crystal display, etc.) has a display screen on which are displayed a screen for setting the target value that is input from the input unit 2 and images represented by the image data before and after a color correction. Image data is stored in the storage device (hard disk, memory card, CD-ROM, etc.) 4 and image data that has been read from the storage device 4 is subjected to color correction processing in the image correction apparatus 1. An image represented by image data after the color correction thereof is printed on photographic printing paper or the like by the printer 5.

As shown in FIG. 2, the image correction apparatus 1 includes a face area demarcating circuit 11, a color correction value calculating circuit 12, a color image probability calculating circuit 13, a color correction value adjusting circuit 14 and an image correcting circuit 15.

The image correcting circuit 15 in the image correction apparatus 1 applies color correction processing to image data (referred to as "original image data" below) that has been read from the storage device 4. The details of color correction processing in the image correcting circuit 15 will be described later.

The color correction processing performed in the image correcting circuit 15 is executed in accordance with an adjusted color correction value that is output from the color correction value adjusting circuit 14. On the basis of a value (the details of which will be described later) that has been calculated by the color image probability calculating circuit 13, the color correction value that has been calculated in the color correction value calculating circuit 12 is adjusted by the color correction value adjusting circuit 14.

It will be assumed that the image represented by the original image data (this image shall be referred to as an "original image" below) contains an image area representing the face of a person (this area shall be referred to as a "face image portion" below). The original image data representing the image containing the face image portion is read out of the storage device 4.

The original image data that has been read out of the storage device 4 is input to the face area demarcating circuit 11, color correction value calculating circuit 12, color image probability calculating circuit 13 and image correcting circuit 15.

The face area demarcating circuit 11 executes processing that demarcates (detects and extracts) the face image portion contained in the original image. Various conventional or novel demarcation (detection) methods can be used in the processing executed by the face area demarcating circuit 11 to demarcate the face image portion. For example, the face image portion is demarcated utilizing pattern matching with regard to image shape, image density, etc. A pattern prepared in advance is scanned across the original image and matching scores are calculated. An area for which a matching score greater than a prescribed value has been obtained is judged to be the face image portion.

It may of course be so arranged that the operator of the digital printing system demarcates the face image portion in the original image from other image portions using the input unit 2 (mouse, etc.) (this is manual demarcation of the face area). In such case the image correction apparatus 1 will not necessarily require the face area demarcating circuit 11.

The face area demarcating circuit 11 outputs binary data in which each pixel contained in the demarcated (detected) face image portion (inside the area of the face image) is made logical "1" (or "0") and each pixel contained in image portions other than the face image portion (outside the area of the face image) is made logical "0" (or "1) (the binary data is data in which a "1" or "0" is associated with every pixel address).

The binary data that is output from the face area demarcating circuit 11 indicates the position and scope (area position) of the face image portion contained in the original image. The binary data that is output from the face area demarcating circuit 11 is referred to as "face area information".

The face area information that has been output from the face area demarcating circuit 11 is input to the color correction value calculating circuit 12 and color image probability calculating circuit 13.

The processing executed by the color correction value calculating circuit 12 will be described first.

The inputs to the color correction value calculating circuit 12 are the target value that is input from the input unit 2, original image data that has been read out of the storage device 4, and the face area information that has been output from the face area demarcating circuit 11.

The color correction value calculating circuit 12 is a circuit that calculates the color correction value, which is for performing a correction in such a manner that the face image portion (a portion that positively contains a large number of skin-tone pixels) will take on a value in line with the target value.

Using the face area information supplied from the face area demarcating circuit 11, the color correction value calculating circuit 12 extracts data representing the face image portion contained in the original image data and then calculates a representative RGB value (e.g., an average value) (or a mode or median value) obtained from an RGB value of every pixel constituting the face image portion represented by the data that represents the extracted face image portion. A gain coefficient with regard to the R value, a gain coefficient with regard to the G value and a gain coefficient with regard to the B value are calculated in such a manner that the representative RGB value and target value (target RGB value) that is input from the input unit 2 will agree.

It may be so arranged that the target values (target RGB values) corresponding to each of a plurality of races (e.g. Caucasoid, Mongoloid and Negroid) is stored in the storage device 4, the race (Caucasoid, Mongoloid or Negroid) is distinguished based upon data representing the face image portion, the target value (target RGB value) is read based upon the result of the distinction from the storage device 4, and the gain coefficient with regard to the R value, the gain coefficient with regard to the G value and the gain coefficient with regard to the G value are calculated based upon the target value that has been read from the storage device 4.

The racial distinction processing based upon the data representing the face image can adopt the technology of the description for the following document.

S. Hosoi, E. Takikawa and M. Kawade, "Ethnicity Estimation with Facial Imaged", IEEE Conf. on Automatic Face and Gesture Recognition, pp 195-200, 2004

The racial distinction processing may be executed by the color value calculating circuit 12, or by the other circuit (e.g. a race distinction circuit (not shown)) provided in the image processing apparatus 1.

An input/output relationship indicated by Equation (1) below is obtained if we let the gain coefficients regarding the R, G and B values obtained by the color correction value calculating circuit 12 based upon the skin-tone area be represented by $g_{r1}$ (>0), $g_{g1}$ (>0) and $g_{b1}$ (>0), respectively.

$$R_1 = g_{r1} \cdot R$$

$$G_1 = g_{g1} \cdot G$$

$$B_1 = g_{b1} \cdot B \qquad \text{Eq. (1)}$$

In Equation (1), R, G and B represent R, G and B values of every pixel that constitutes the original image, and $R_1$, $G_1$ and $B_1$ represent R, G and B values that result after the application of the gain coefficients regarding RGB obtained by the color correction value calculating circuit 12 (i.e., after the color correction).

The gain coefficients $g_{r1}$, $g_{g1}$, and $g_{b1}$ for the R, G and B values, respectively, are referred to collectively as a color correction value. The color correction value will be expressed by Equation (2) below to facilitate the description.

$$\text{color correction value } AWB = (g_{r1}, g_{g1}, g_{b1}) \qquad \text{Eq. (2)}$$

The color correction value AWB can be calculated based upon the RGB values, as mentioned above, and can also be calculated based upon anti-logarithm RGB values. It may also be so arranged that the color correction value is calculated based upon an average skin-tone chromaticity value, which is obtained by converting the average RGB value to a chromaticity value, and the target value that is input from the input unit 2 (the target value in this case is a chromaticity value). Further, it may be so arranged that the color correction value is adjusted in such a manner that the brightness of the image after the color correction will not change.

The color correction value $AWB = (g_{r1}, g_{g1}, g_{b1})$ calculated in the color correction value calculating circuit 12 is applied to the color correction value adjusting circuit 14.

The processing executed by the color image probability calculating circuit 13 will be described next. The inputs to the color image probability calculating circuit 13 are the original image data read out of the storage device 4 and the face area information that has been output from the face area demarcating circuit 11.

Based upon the face area information that has been output from the face area demarcating circuit 11, the color image probability calculating circuit 13 extracts the face image portion from the original image represented by the original image data and then calculates the probability that the extracted face image portion is a color image.

The color image probability calculating circuit 13 calculates the probability that the face image portion is a color image based upon an angle formed by an average color vector (referred to as a "face-image average color vector" below) obtained from the face image portion and a gray color vector.

Figure 3:
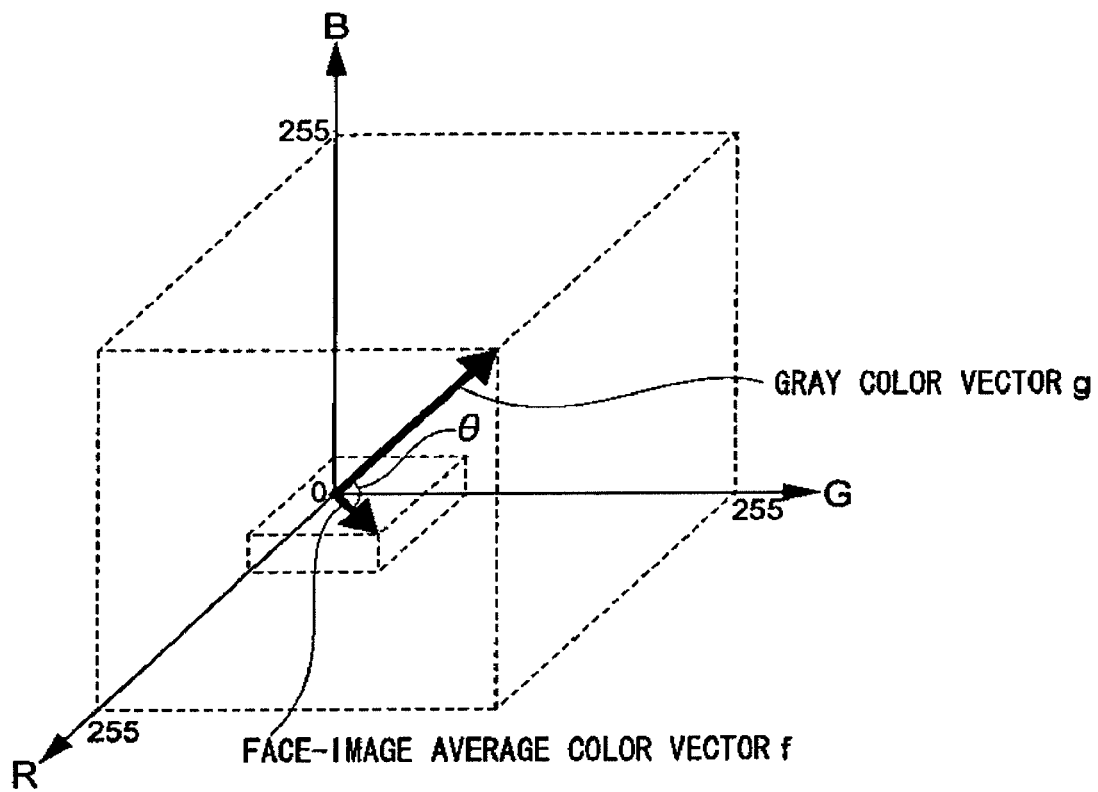
FIG. 3 is a diagram illustrating the relationship among a gray color vector g, face-image average color vector f and angle θ defined by the gray color vector g and face-image average color vector f in RGB three-dimensional space.

FIG. 3 illustrates the gray color vector g, the face-image average color vector f and an angle $\theta$ formed by the gray color vector g and face-image average color vector f in RGB three-dimensional space.

In this embodiment, each of the R, G, B values is represented by 256 levels of 0.0 to 255.

The gray color vector g is a vector stipulated in RGB three-dimensional space by the origin and RGB=(255,255, 255).

The face-image average color vector f is a vector stipulated in RGB three-dimensional space by the origin and average values of each of the R, G and B values of pixels constituting the face image portion.

The larger the saturation of the face image portion, the larger the value of the angle $\theta$ formed by the gray color vector g and face-image average color vector f. That is, the angle $\theta$ formed by the gray color vector g and face-image average color vector f can be used as an indicator that represents the saturation of the face image portion.

Figure 4:
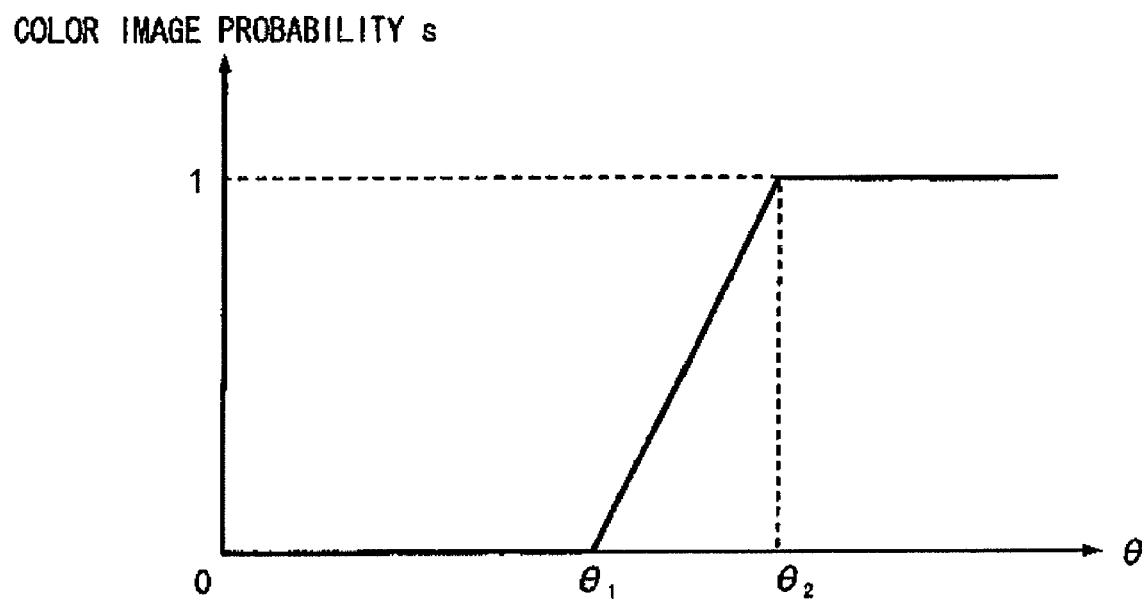
FIG. 4 is a graph illustrating the relationship between the angle θ, which is defined by the gray color vector g and face-image average color vector f, and color face probability s ($0 \leq s \leq 1$) of a face image portion.

FIG. 4 is a graph illustrating the relationship between the angle $\theta$, which is defined by the gray color vector g and face-image average color vector f, and color image probability s ($0 \leq s \leq 1$) of the face image portion. The color image probability calculating circuit 13 stores the data representing the graph shown in FIG. 4 (the data representing the corresponding relationship between the angle $\theta$ and the color image probability s).

As mentioned above, the angle $\theta$ formed by the gray color vector g and face-image average color vector f is an indicator that represents the saturation of the face image portion; the higher the saturation, the larger the value of the indicator, the lower the saturation, the smaller the value of the indicator.

If the angle $\theta$ formed by the gray color vector g and face-image average color vector f is small, i.e., if the saturation of the face image portion is low, then the probability that the face image portion is not a color image is high. As indicated in FIG. 4, if the angle $\theta$ is less than a first threshold value $\theta_1$ (or if the angle $\theta$ is equal to or less than the first threshold value $\theta_1$), then the color image probability calculating circuit 13 outputs "0" as the value of the color image probability s of the face image portion.

On the other hand, if the angle $\theta$ formed by the gray color vector g and face-image average color vector f is large, i.e., if the saturation of the face image portion is high, then the probability that the face image portion is a color image is high. As indicated in FIG. 4, if the angle $\theta$ is equal to or greater than a second threshold value $\theta_2$ (or if the angle $\theta$ is greater than the first threshold value $\theta_2$), then the color image probability calculating circuit 13 outputs "1" as the value of the color image probability s of the face image portion.

If the angle $\theta$ formed by the gray color vector g and face-image average color vector f is a value between the first threshold value $\theta_1$ and second threshold value $\theta_2$, then the color image probability s is decided to fall between 0 and 1 in accordance with the angle $\theta$. The larger the angle $\theta$, the higher the color image probability s.

Figure 5:
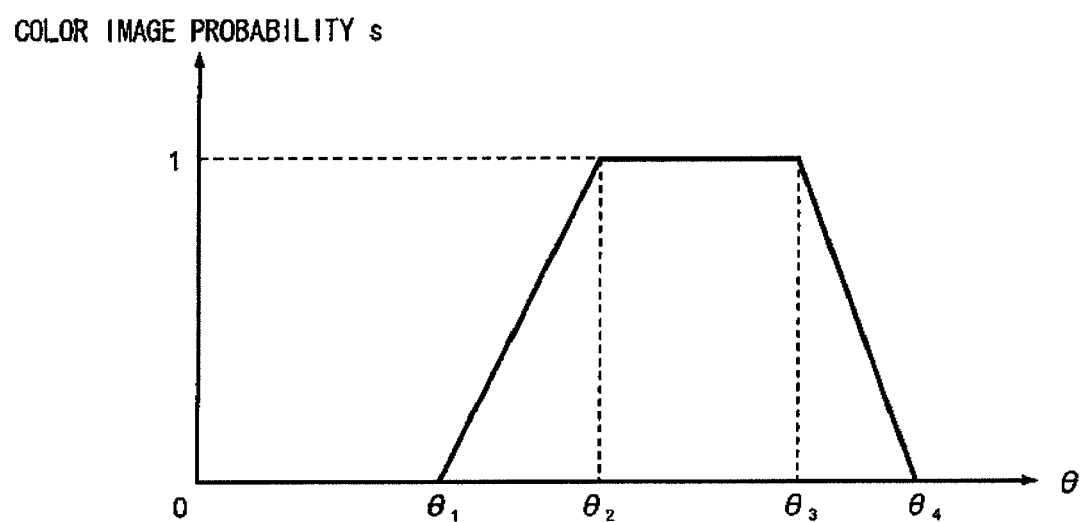
FIG. 5 shows another example of a graph illustrating the relationship between the angle θ, which is defined by the gray color vector g and face-image average color vector f, and color face probability s ($0 \leq s \leq 1$) of a face image portion.

FIG. 5 is a graph illustrating another example of the relationship between the angle $\theta$, which is formed by the gray color vector g and face-image average color vector f, and the color image probability s ($0 \leq s \leq 1$).

The graph shown in FIG. 5 differs from that shown in FIG. 4 in that threshold values $\theta_3$ and $\theta_4$ are further defined. If the angle $\theta$ formed by the gray color vector g and face-image average color vector f is greater than the threshold value $\theta_3$, then the larger the angle $\theta$, the smaller the color image probability s. For example, if the face image portion is created by computer graphics processing or a picture is taken of a person whose face has been painted, the saturation of the face image portion will be greater than a saturation obtained from a face image portion acquired by ordinary photography. Although such image data is color image data, it is not an ordinary color image and therefore the color image probability s is reduced.

In any case, the color image probability calculating circuit 13 calculates the angle $\theta$ serving as the indicator that represents the saturation of the face image portion, calculates the color image probability s of the face image portion based upon the angle $\theta$ calculated and outputs the color image probability s.

The color image probability s of the face image portion that has been output from the color image probability calculating circuit 13 is applied to the color correction value adjusting circuit 14 (see FIG. 2).

The color image probability s of the face image portion that has been output from the color image probability calculating circuit 13 and the color correction value AWB ($g_{r1}, g_{g1}, g_{b1}$) that has been calculated in the color correction value calculating circuit 12 are applied to the color correction value adjusting circuit 14.

Using the color image probability s and color correction value AWB ($g_{r1}, g_{g1}, g_{b1}$), the color correction value adjusting circuit 14 calculates an adjusted color correction value that is based upon the following equation:

$$\text{adjusted color correction value } AWB = \{[(g_{r1}-1)s+1], [(g_{g1}-1)s+1], [(g_{b1}-1)s+1]\} \quad \text{Eq. (3)}$$

Equation (3) will now be described. The color image probability s of the face image portion takes on values of 0 to 1, as mentioned above. In a case where the color image probability s of the face image portion is "0", the adjusted color correction value AWB becomes (1,1,1), as is evident from Equation (3) above. If the color image probability s is a value greater than 0 but less than 1, then the adjusted color correction value AWB takes on a value smaller than the color correction value ($g_{r1}$ $g_{g1}$, $g_{b1}$) that has been calculated in the color correction value calculating circuit 12. If the color image probability s is "1", then the adjusted color correction value is the same as the color correction value ($g_{r1}$ $g_{g1}$, $g_{b1}$) calculated in the color correction value calculating circuit 12.

Thus, if the color image probability s of the face image portion in the original image to be processed is "1", i.e., if it has been determined that the face image portion is an ordinary color image, then the color correction value adjusting circuit 14 applies the color correction value, which has been calculated in the color correction value calculating circuit 12, as is. The color correction value adjusting circuit 14 adjusts the color correction value AWB in such a manner that the higher the probability that the face image portion is not a color image (the lower the probability that the face image portion is a color image), the weaker the correction effect by the color correction value AWB becomes. If the color image probability s is "0", i.e., if it has been determined that the face image portion is not an ordinary color image, then the color correction value AWB is adjusted so as to weaken the correction effect by the color correction value AWB.

The adjusted color correction value obtained in the color correction value adjusting circuit 14 is input to the image correcting circuit 15. Here the original image data (which may be only data representing the face image portion) is subjected to a color correction based upon the corrected color correction value.

By way of example, if the entirety of the original image to be processed is a monochrome image, then a face image portion contained in the original image naturally will be a monochrome image. In this case, the color image probability s of the face image portion will be "0" and the adjusted color correction value will be (1,1,1). No color correction, therefore, is performed. If a face image portion that is a monochrome image is contained in the original image to be processed, then the face image portion can be prevented from being made a color image without reason.

There are original images in which a monochrome image is contained in a color image. If a color photo is taken so as to include a monochrome picture being exhibited at an exhibition of portraits based upon black-and-white photographs, then the image obtained by taking this color photo will contain both a color image portion and a monochrome image portion. Even if such an image is the original image to be processed, the monochrome image portion will be made a color image without reason.

On the other hand, if the face image portion is a color image if color image probability s=1 holds), then the face image portion (or the entire original image) can be subjected to a color correction in such a manner that the face image portion (skin-tone color) will take on the ideal skin tone. Furthermore, the color image probability s is not restricted to 0 or 1 but takes on a value of 0 to 1 in continuous fashion in accordance with the indicator (the angle θ formed by the gray color vector g and face-image average color vector f) representing the saturation of the face image portion. The results of color correction processing will not diverge in an extreme manner.

In the embodiment described above, the color correction value AWB is adjusted based upon the color image probability s calculated in accordance with an indicator (the angle θ formed by the gray color vector g and face-image average color vector f) representing the saturation of the face image portion. However, it may be so arranged that the color correction value is adjusted using, in addition to the color image probability s, at least one of the following: the area ratio of a face image portion in the original image; the reliability that a face image portion exists in the original image (e.g., the degree of certainty that the image portion is a face image portion is put into numerical form using matching values obtained from pattern matching); and degree of importance of a face image portion (a value, which in input by the user, placing emphasis on the face image portion). For example, assume that the area ratio of a face image portion in an original image is less than a prescribed value. If a color correction value obtained with regard to the face image portion is applied to the entire original image in such case, there is the danger that the color correction will be performed in such a manner that the areas of the original image with the exception of the face image portion will not take on the appropriate tint. For this reason, it is so arranged that if the area ratio of the face image portion in the original image is less than a prescribed value, the color correction value AWB is adjusted so as to weaken the effect of the color correction. Further, it is so arranged that if a color distance between a average RGB value and a predetermined average skin-color value is large, the color correction value AWB may be adjusted in such manner that the larger the area ratio of the face image portion, the weaker the correction effect by the color correction value AWB becomes.

Further, assume that an original image contains a plurality of face images and that the plurality of face images have been demarcated (detected) in the face area demarcating circuit 11. In such case it may be adopted the following the representative RGB value; the representative RGB value of the face image portion with the largest area; the representative RGB value of the face image portion that is located at center or the nearest center of the original image to be processed; the representative RGB value of the face image portion with the largest reliability; the representative RGB value that is closest or furthest to the target RGB value. It may be prepared the target RGB values for each race (Caucasoid, Mongoloid, Negroid, etc), and adopted the representative RGB value that is the closest to the target RGB value of the race specified in advance. The representative RGB value can be calculated utilizing all the face image portions. The color correction value and color image probability s may be calculated with regard to each of the plurality of face images and an adjusted color correction value AWB, which is obtained in a case where the face image for which the lowest color image probability s has been calculated is adopted as the object of processing, is used in the processing for correcting the image data. This makes it possible to prevent the application of an unsuitable color correction.

Further, in the embodiment described above, the color correction value AWB is adjusted upon calculating the color image probability s, which represents whether the face image portion is a color image or monochrome image (i.e., whether it approximates a color image or approximates a monochrome image), in accordance with the angle θ formed by the gray color vector g and face-image average color vector f. Naturally, however, relationships are not limited to the relationship between a color image and a monochrome image. Even in the case of other relationships, such as the relationship between a color image and a sepia-toned image or between a monochrome image and a sepia-toned image, the color correction value AWB can be adjusted upon calculating the color image probability s, in a manner similar to that set forth above, utilizing a sepia color vector defined in RGB three-dimensional space. It goes without saying that the color image probability s can also be calculated as representing that a face image portion is any one (or approximates any one) of three or more image types, such as a color image, monochrome image and sepia image.

The color image probability s can be calculated based upon the angle θ (the indicator representing saturation) formed by the gray color vector g and face-image average color vector f, and can also be calculated utilizing hue or chromaticity (the color image probability s need only be calculated using a hue vector defined in hue space or a chromaticity vector defined in chromaticity space).

[Second Embodiment]

Figure 6:
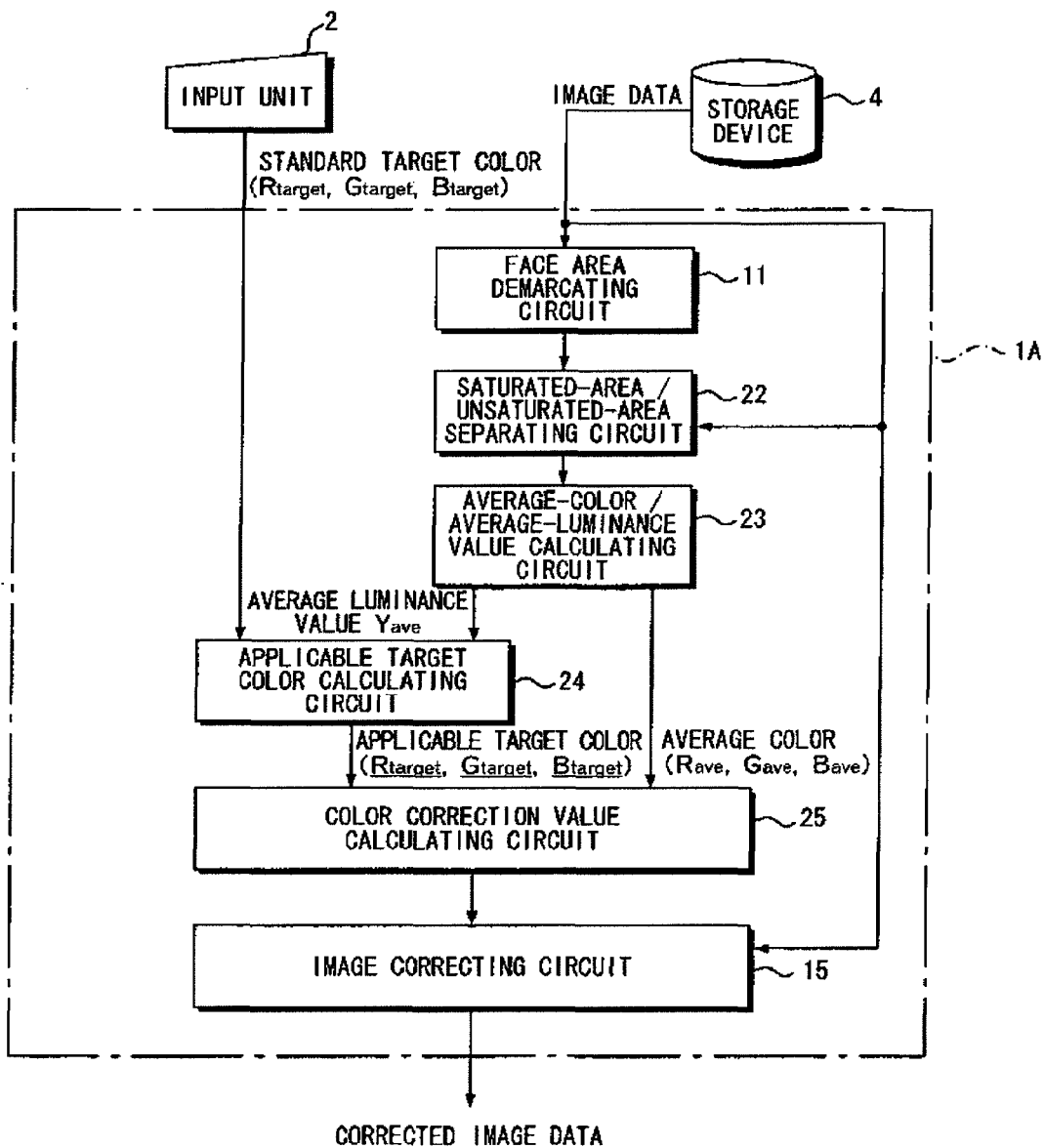
FIG. 6 is a block diagram illustrating in detail the electrical structure of an image correction apparatus as well as the flow of data in the apparatus according to a second embodiment of the present invention.

FIG. 6 is a block diagram illustrating in detail the electrical structure of an image correction apparatus 1A according to a second embodiment of the present invention. Circuits identical with those that construct the image correction apparatus 1 (see FIG. 2) of the first embodiment are designated by like reference characters and need not be described again.

As shown in FIG. 6, the image correction apparatus 1A includes the face area demarcating circuit 11, a saturated-area/unsaturated-area separating circuit 22, an average-color/average-luminance value calculating circuit 23, an applicable target color calculating circuit 24, a color correction value calculating circuit 25 and the image correcting circuit 15.

It will be assumed that an image (the "original image" below) represented by image data ("original image data" below) read out of the storage device 4 and to be subjected to processing contains an image area representing the face of a person (this area shall be referred to as a "face image portion" below). The original image data representing the image containing the face image portion is read out of the storage device 4.

The original image data that has been read out of the storage device 4 is input to the face area demarcating circuit 11, saturated-area/unsaturated-area separating circuit 22 and image correcting circuit 15.

As described above, the face area demarcating circuit 11 executes processing that demarcates (detects and extracts) the face image portion contained in the original image.

The face area information that has been output from the face area demarcating circuit 11 is input to the saturated-area/unsaturated-area separating circuit 22. As mentioned above, the original image data to be processed and that has been read out of the storage device 4 is also input to the saturated-area/unsaturated-area separating circuit 22.

The saturated-area/unsaturated-area separating circuit 22 separates the data, which represents the face image portion contained in the original image represented by the original image data, into saturated and unsaturated areas. A "saturated area" signifies an area (a pixel group) composed of pixels for which at least any value among RGB values of the plurality of pixels that constitute an image is maximum (e.g., 255), and an "unsaturated area" signifies an area (a pixel group) composed of pixels for which none of the RGB values of the plurality of pixels that constitute an image is maximum (e.g., 255).

The saturated-area/unsaturated-area separating circuit 22 demarcates (extracts) a face image portion contained in the original image based upon the face area information that has been output from the face area demarcating circuit 11 and separates the demarcated face image portion into saturated and unsaturated areas.

The saturated-area/unsaturated-area separating circuit 22 outputs image data regarding the unsaturated area from the face image portion that has been separated into the saturated and unsaturated areas. The image data that is output from the saturated-area/unsaturated-area separating circuit 22 representing the unsaturated area in the face image portion shall be referred to as "face-image unsaturated area data" below. The image represented by the face-image unsaturated area data shall be referred to as a "face-image unsaturated area" below.

The face-image unsaturated area data that has been output from the saturated-area/unsaturated-area separating circuit 22 is input to the average-color/average-luminance value calculating circuit 23.

The average-color/average-luminance value calculating circuit 23 calculates average color (average RGB values) ($R_{ave}$, $G_{ave}$, $B_{ave}$) and an average luminance value $Y_{ave}$ regarding the face-image unsaturated area in accordance with the following equations:

$$R_{ave}=(\Sigma Ri)/n$$

$$G_{ave}\leq(\Sigma Gi)/n \quad\quad\quad \text{Eq. (4)}$$

$$B_{ave}=(\Sigma Bi)/n$$

$$Y_{ave}=0.3R_{ave}+0.6G_{ave}+0.1B_{ave} \quad\quad\quad \text{Eq. (5)}$$

In Equations (4), i signifies each pixel that constitutes the face-image unsaturated area, and n signifies the number of pixels that constitute the face-image unsaturated area.

Thus, the average-color/average-luminance value calculating circuit 23 calculates the average color (average RGB values) and average luminance value of the unsaturated area in the face image portion based upon the face-image unsaturated area data that has been output from the saturated-area/unsaturated-area separating circuit 22.

The reason for calculating the average color (average RGB values) and average luminance value using the unsaturated area in the face image portion is that there is a possibility that the saturated area will have a clipped value that is different from the actual value owing to a limitation imposed by the color reproduction region (e.g., a range of numerical values of 256 levels of from 0 to 255). (For example, there are instances where the actual value is a numerical value larger than 255 but the value is clipped at 255 owing to the limit imposed by the reproduction region.) In other words, there is the possibility that the saturated area will not possess RGB values that faithfully (accurately) represent the color of the image of the subject because of the color reproduction region. By contrast, the unsaturated area has RGB values that represent the color of the image of the subject relatively faithfully in comparison with the saturated area. By calculating the average color and average luminance value of the face image portion based upon the face-image unsaturated area data, it is possible to calculate a more accurate average color and average luminance value of the face image portion.

It goes without saying that if a high precision is not required for the average color and average luminance value of a face image portion, then the average color and average luminance value of the face image portion may be calculated using the pixels of the entire area of the face image portion. In such case the saturated-area/unsaturated-area separating circuit 22 will not necessarily be required.

Of the average color (average RGB values) ($R_{ave}$, $G_{ave}$, $B_{ave}$) and an average luminance value $Y_{ave}$ regarding the face image portion calculated in the average-color/average-luminance value calculating circuit 23, the average color (average RGB values) ($R_{ave}$, $G_{ave}$, $B_{ave}$) is applied to the color correction value calculating circuit 25 and the average luminance value $Y_{ave}$ is applied to the applicable target color calculating circuit 24.

Figure 7:
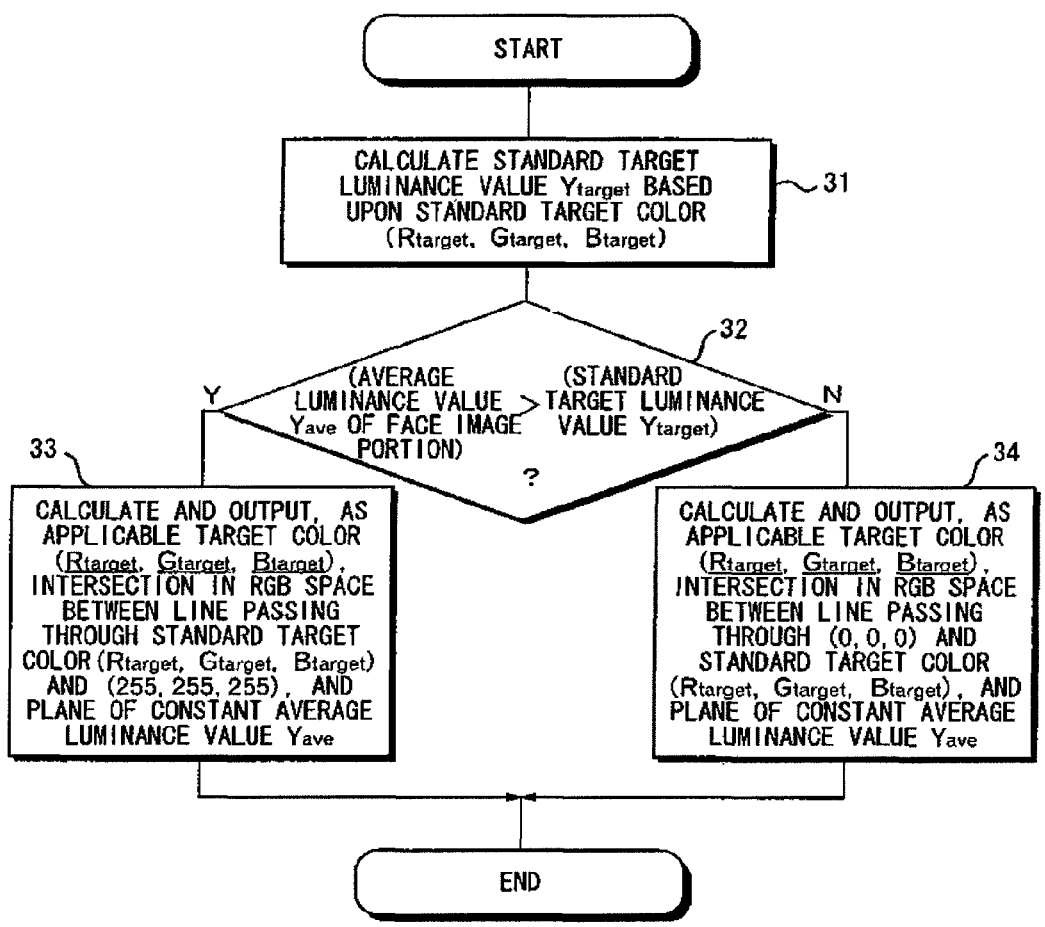
FIG. 7 is a flowchart illustrating the flow of processing executed by an applicable target color calculating circuit.

The processing executed by the applicable target color calculating circuit 24 will be described next. FIG. 7 is a flowchart illustrating the flow of processing executed by the applicable target color calculating circuit 24.

The average luminance value $Y_{ave}$ of the face image portion is applied to the applicable target color calculating circuit 24, as mentioned above, and a standard target color ($R_{target}$, $G_{target}$, $B_{target}$) that is input from the input unit 2 is also input to the applicable target color calculating circuit 24. The standard target color ($R_{target}$, $G_{target}$, $B_{target}$) is a target color of the face image portion (a skin-tone portion). The standard target color ($R_{target}$, $G_{target}$, $B_{target}$) may be one that has been set in advance. Although the details will be described later, the standard target color that has been input (or set) is not used as is but is modified (an applicable target color is calculated) in accordance with the brightness of the face image portion.

A standard target luminance value $Y_{target}$ is calculated based upon the standard target color ($R_{target}$, $G_{target}$, $B_{target}$) that has been input from the input unit 2 (step 31). The standard target luminance value $Y_{target}$ is found by an equation similar to Equation (5) cited above.

The size of the average luminance value $Y_{ave}$ of the face image portion and the size of the standard target luminance value $Y_{target}$ found based upon the standard target color ($R_{target}$, $G_{target}$, $B_{target}$) are compared (step 32).

If the average luminance value $Y_{ave}$ of the face image portion is equal to or less than standard target luminance value $Y_{target}$ ("NO" at step 32), i.e., if the brightness of the face image portion obtained from the original image data to be processed is equal to or less than the brightness set by the operator (brightness obtained from the standard target color set by the operator), then the point of intersection in RGB space between a line, which passes through the origin (0,0,0) and the standard target color ($R_{target}$, $G_{target}$, $B_{target}$), and a plane of constant average luminance value $Y_{ave}$ is adopted as a new target color [applicable target color ($R_{target}$, $G_{target}$, $B_{target}$)] (step 34). As will be described later, the applicable target color ($R_{target}$, $G_{target}$, $B_{target}$) is applied to the color correction value calculating circuit 25. The color correction value calculating circuit 25 calculates a correction value (correction coefficient) for correcting the average color ($R_{ave}$, $G_{ave}$, $B_{ave}$) to the applicable target color ($R_{target}$, $G_{target}$, $B_{target}$). The calculated correction value (correction coefficient) is used in the image correcting circuit 15 to apply a color correction to the original image data. The face image portion after the color correction thereof is color-corrected so as to have the brightness (average luminance value $Y_{ave}$) of the face image portion obtained from the original image data to be processed and have a color (tint) that is in line with the standard target color ($R_{target}$, $G_{target}$, $B_{target}$) that has been set by the operator.

On the other hand, if the average luminance value $Y_{ave}$ of the face image portion is greater than the standard target luminance value $Y_{target}$ ("YES" at step 32), i.e., if the brightness of the face image portion obtained from the original image data to be processed is greater than the brightness set by the operator (brightness obtained from the standard target color set by the operator), then the point of intersection in RGB space between a line, which passes through the standard target color ($R_{target}$, $G_{target}$, $B_{target}$) and the RGB maximum value (255,255,255), and a plane of constant average luminance value $Y_{ave}$ of the face image portion is output as the applicable target value ($R_{target}$, $G_{target}$, $B_{target}$) (step 33).

The calculation of the applicable target color (steps 32, 33 and 34) will be described with reference to FIG. 8. In FIG. 8, the average color ($R_{ave}$, $G_{ave}$, $B_{ave}$) of a face image portion in RGB space is indicated by the Δ symbol, the standard target color ($R_{target}$, $G_{target}$, $B_{target}$) is indicated by the phantom O symbol, and applicable target colors ($R_{target}$, $G_{target}$, $B_{target}$) are indicated by the ● and x symbols. The plane indicated by the hatching is the plane of a constant average luminance value $Y_{ave}$ obtained from the average color ($R_{ave}$, $G_{ave}$, $G_{ave}$) (Δ) of the face image portion. The average color ($R_{ave}$, $G_{ave}$, $B_{ave}$) of the face image portion and the applicable target colors ($R_{target}$, $G_{target}$, $B_{target}$) (● and x) lie on the plane of constant average luminance value $Y_{ave}$.

If the brightness of the face image portion after the color correction is the same as the brightness of the face image portion before the color correction and manifests a tint that is in line with the standard target color that has been input (set), then it will suffice to adopt the intersection between the line passing through origin (0,0,0) and the standard target color ($R_{target}$, $G_{target}$, $B_{target}$) (indicated by the phantom O symbol) and the plane of constant average luminance value $Y_{ave}$ as the applicable target color. This applicable target color is indicated by x in FIG. 8 (this is an applicable target color B). If the brightness of the face image portion is comparatively dark ("NO" at step 32), then the applicable target color B is output from the applicable target color calculating circuit 24 (step 34).

It is known that if an image is comparatively bright, then the influence of saturation of the image visually recognized is comparatively greater. Saturation is a value related to the sharpness of an image. This means that the greater the distance an RGB value has from the line passing through the origin (0,0,0) and the RGB maximum value (255,255,255) in RGB space, the higher the saturation.

The saturation defined by the point of intersection (an applicable target color B) (x) between the line passing through the origin (0,0,0) and the standard target color ($R_{target}$, $G_{target}$, $B_{target}$) (indicated by the phantom O symbol), and the plane of constant average luminance value $Y_{ave}$ has a saturation greater than the saturation defined by the standard target color ($R_{target}$, $G_{target}$, $B_{target}$) (indicated by the phantom O symbol). If, in a case where the face image portion is comparatively bright, a color correction is performed in such a manner that the average color of the face image portion (the average RGB value) (Δ) will have the applicable target color B (x), then the saturation of the face image portion after the color correction will be too high and the face image portion after the color correction will give an impression of having been color-corrected excessively.

Accordingly, in a case where the face image portion is comparatively bright, i.e., in a case where the average luminance value $Y_{ave}$ of the face image portion is greater than the standard target luminance value $Y_{target}$ (YES at step 32), the applicable target color calculating circuit 24 calculates and outputs, as the applicable target color ($R_{target}$, $G_{target}$, $B_{target}$) (●) (an applicable target color A), the point of intersection in RGB space between the line passing through the standard target color ($R_{target}$, $G_{target}$, $B_{target}$) (indicated by the phantom O symbol) and the RGB maximum value (255,255,255), and the plane of constant average luminance value $Y_{ave}$ obtained from the face image portion. The applicable target color A (●) thus calculated is closer to the line passing through the origin (0,0,0) and the RGB maximum value (255,255,255) in comparison with the case where the applicable target color B (x) is adopted as the new applicable standard color. The saturation, therefore, is low. This makes it less likely that the face image portion after the color correction will give an impression of having been color-correction excessively.

It goes without saying that if the saturation of the face image portion after the color correction is not taken into account, it may be so arranged that even if the face image portion is bright, the applicable target color B (x) is adopted as the new applicable standard color. Further, it may be so arranged that in accordance with a command from the operator of the digital printing system, switching is performed between adopting the applicable target color B (x) as the new applicable standard color and adopting the applicable target color A (●) as the new applicable target color.

Further, the applicable target color B (x) may be calculated first, then the calculated applicable target color B (x) may be moved (modified) on the plane of constant average luminance value $Y_{ave}$ in such a manner that the calculated applicable target color B (x) will reside on the line passing through the standard target color ($R_{target}$, $G_{target}$, $B_{target}$) (indicated by the phantom O symbol) and the RGB maximum value (255,255, 255) (to obtain the applicable target color A).

The determination as to whether the face image portion is comparatively bright may be made based upon whether the average luminance value $Y_{ave}$ is greater than the standard target luminance value $Y_{target}$, as mentioned above, or may be made using another luminance value, e.g., a luminance value that is entered (or set), instead of the standard target luminance value $Y_{target}$.

Further, it may be so arranged that the standard target color ($R_{target}$, $G_{target}$, $B_{target}$) is output as is as the applicable target value ($R_{target}$, $G_{target}$, $B_{target}$) if the face image portion is comparatively dark. In this case the face image portion after the color correction would be color-corrected so as to have a brightness decided based upon the standard target color ($R_{target}$, $G_{target}$, $B_{target}$).

The applicable target value ($R_{target}$, $G_{target}$, $B_{target}$) that has been calculated is applied from the applicable target color calculating circuit 24 to the color correction value calculating circuit 25. The average color ($R_{ave}$, $G_{ave}$, $B_{ave}$) of the face image portion also is applied to the color correction value calculating circuit 25, as mentioned above, and the color correction value calculating circuit 25 calculates the color correction value (gain coefficients with regard to respective ones of the RGB values) in accordance with the following equations based upon the applicable target value ($R_{target}$, $G_{target}$, $B_{target}$) and the average color ($R_{ave}$, $G_{ave}$, $B_{ave}$) of the face image portion:

$$_{gain}R = R_{target}/R_{ave}$$

$$_{gain}G = G_{target}/R_{ave}$$

$$_{gain}B = B_{target}/R_{ave} \quad \text{Eq. (6)}$$

The color correction value calculated in the color correction value calculating circuit 25 is applied to the image correcting circuit 15. Using the color correction value (the gain coefficients with regard to respective ones of the RGB values), the image correcting circuit 15 corrects the RGB values of each pixel constituting the original image in accordance with the following equations:

$$R_{out} = {_{gain}R} \cdot R_{in}$$

$$G_{out} = {_{gain}G} \cdot G_{in}$$

$$B_{out} = {_{gain}B} \cdot B_{in} \quad \text{Eq. (7)}$$

where $R_{in}$, $G_{in}$, $B_{in}$ represent RGB values of each pixel constituting, the original image, and $R_{out}$, $B_{out}$, $G_{out}$ represent the RGB values of each pixel constituting the original image after the color correction.

It may be so arranged that instead of applying the color correction to the entire original image based upon Equation (7), the color correction is applied only to the face image portion in the original image based upon Equation (7).

Look-up tables may be created instead of calculating the gain coefficients of Equation (6), and the color correction may be applied based upon the look-up tables created. For example, a look-up table for the R value is created by interpolating (as by a spline interpolation) the three points ($R_{in}$, $R_{out}$)=(0, 0), ($R_{ave}$, $R_{target}$) and (255,255).

In the second embodiment set forth above, processing for calculating the applicable target color has been described using RGB space. However, the applicable target color can be calculated utilizing lab space, anti-logarithm RGB space, HSV space or chromaticity space, etc.

In the second embodiment, it also may be so arranged that the standard target colors (standard target RGB values) corresponding to each of a plurality of races (e.g. Caucasoid, Mongoloid and Negroid) are stored in the storage device 4, the race (Caucasoid, Mongoloid or Negroid) of a person is distinguished based upon data representing the face image portion, the standard target color (standard target RGB value) based upon the result of the distinction is read from the storage device 4, and utilize it.

It may be so arranged that the race may be designated by the operator of the digital printing system. The standard target color corresponding to the race designated by the operator is utilized.

As many apparently widely different embodiments of the present invention can be made without departing from the spirit and scope thereof, it is to be understood that the invention is not limited to the specific embodiments thereof except as defined in the appended claims.

What is claimed is:

1. An image correction apparatus comprising:
    a representative color information calculating device which calculates color information representative of a specific image contained in an image represented by applied image data;
    a target color information setting device which sets target color information;
    a target color information modifying device which modifies the target color information, while maintaining a tint that is based upon the target color information that has been set by said target color information setting circuit, in such a manner that target brightness information calculated based upon the target color information that has been set will be the same as representative brightness information of the specific image calculated based upon the representative color information of the specific image that has been calculated by said representative color information calculating circuit; and
    an image data correcting circuit which corrects at least data representing the specific image in the applied image data in such a manner that the representative color information of the specific image that has been calculated by said representative color information calculating circuit will have the modified target color information obtained as a result of the modification by said target color information modifying circuit;
    said target color information modifying device adopts as the modified target color information a point of intersection in color space between a line, which passes through the origin or a maximum point comprising a maximum point of a red color, a maximum point of a green color and a maximum point of a blue color of an RGB color space, and which also passes through a point stipulated by the target color information, and a constant-brightness plane stipulated by the representative color information of the specific image.

2. The apparatus according to claim 1, wherein the specific image is a face image of a person;

the apparatus further comprising target color information storage device for storing target color information corresponding to each of a plurality of races; and race distinction circuit for distinguishing a race of the person represented by said specific image data representing the face image;

said target color information setting device sets the target color information with regard to the race distinguished by said race distinction circuit.

3. The apparatus according to claim 1, wherein said target color information modifying device adopts as the modified target color information a point of intersection in color space between a line, which passes through the origin and a point stipulated by the target color information, and a constant-brightness plane stipulated by the representative color information of the specific image.

4. The apparatus according to claim 3, further comprising second target color information modifying device for further modifying the modified target color information so as to diminish saturation that is based upon the modified target color information obtained by said target color information modifying device.

5. The apparatus according to claim 1, wherein said target color information modifying device adopts as the modified target color information a point of intersection in color space between a line, which passes through a point stipulated by the target color information and a maximum point in color space, and a constant-brightness plane stipulated by representative brightness information of the specific image.

6. The apparatus according to claim 1, further comprising determination means for determining whether the representative brightness information of the specific image exceeds a prescribed threshold value;

wherein said target color information modifying circuit modifies the target color information if it has been determined by said determination circuit that the representative brightness information exceeds the prescribed threshold value.

7. The apparatus according to claim 1, wherein said representative color information calculating device calculates the color information based on an average RGB value as determined by the RGB values of each pixel of the specific image data.

8. The apparatus according to claim 1, further comprising a saturated-area/unsaturated-area separating circuit which separates the data, which represents the specific image, into saturated and unsaturated areas, wherein the representative color information calculating device calculates color information representative of the specific image using the data of unsaturated area.

9. A tangible, non-transitory computer readable medium embodied with a program for causing a computer to execute a method of image correction, the method comprising:

representative color information calculating processing for calculating color information representative of a specific image contained in an image represented by applied image data;

target color information setting processing for setting target color information;

target color information modifying processing for modifying the target color information, while maintaining a tint that is based upon the target color information that has been set by said target color information setting processing, in such a manner that target brightness information calculated based upon the target color information that has been set will be the same as representative brightness information of the specific image calculated based upon the representative color information of the specific image that has been calculated by said representative color information calculating processing;

image data correction processing for correcting at least data representing the specific image in the applied image data in such a manner that the representative color information of the specific image that has been calculated by said representative color information calculating processing will have the modified target color information obtained as a result of the modification by said target color information modifying processing; and displaying the corrected image on a display;

wherein said target color information modifying processing adopts as the modified target color information a point of intersection in color space between a line, which passes through the origin or a maximum point comprising a maximum point of a red color, a maximum point of a green color, and a maximum point of a blue color of an RGB color space, and which also passes through a point stipulated by the target color information, and a constant-brightness plane stipulated by the representative color information of the specific image.

10. An image correction apparatus comprising:

a representative color information calculating device which calculates color information representative of a specific image contained in an image represented by applied image data;

a target color information setting device which sets target color information;

a target color information modifying device which modifies the target color information, while maintaining a tint that is based upon the target color information that has been set by said target color information setting circuit, in such a manner that target brightness information calculated based upon the target color information that has been set will be the same as representative brightness information of the specific image calculated based upon the representative color information of the specific image that has been calculated by said representative color information calculating circuit; and an image data correcting circuit which corrects at least data representing the specific image in the applied image data in such a manner that the representative color information of the specific image that has been calculated by said representative color information calculating circuit will have the modified target color information obtained as a result of the modification by said target color information modifying circuit, wherein said color target color information modifying device adopts as the modified target color information a point of intersection in color space between a line, which passes through the origin or a maximum point and a point stipulated by the target color information, and a constant-brightness plane stipulated by the representative color information of the specific image, and wherein the constant brightness plane is preset prior to image correction.

11. The apparatus of claim 10, further comprising a saturated-area/unsaturated-area separating circuit which separates the data, which represents the specific image, into saturated and unsaturated areas, wherein the representative color information calculating device calculates color information representative of the specific image using only the data of unsaturated areas.

* * * * *